INVENTOR
NORMAN G. BARTRUG

BY
ATTORNEYS a
United States Patent Office 3,583,882
Patented June 8, 1971

---

3,583,882
PROCESS FOR PREPARING ELASTOMER COATED GLASS FIBERS
Norman G. Bartrug, Allison Park, Pa., assignor to Pittsburgh Plate Glass Company, Pittsburgh, Pa.
Continuation of application Ser. No. 662,384, Aug. 22, 1967. This application Apr. 10, 1970, Ser. No. 28,164
Int. Cl. B44d 1/50; C03c 25/02
U.S. Cl. 117—72                                      6 Claims

ABSTRACT OF THE DISCLOSURE

Soft water is employed as the aqueous medium in an aqueous elastomeric coating composition that is applied to glass fibers that are to be used as an elastomer reinforcement. The soft water reduces the tendency of particles of the coating composition to fly off the glass fibers during drying of the coated fibers in a dielectric oven.

---

Figure 1:
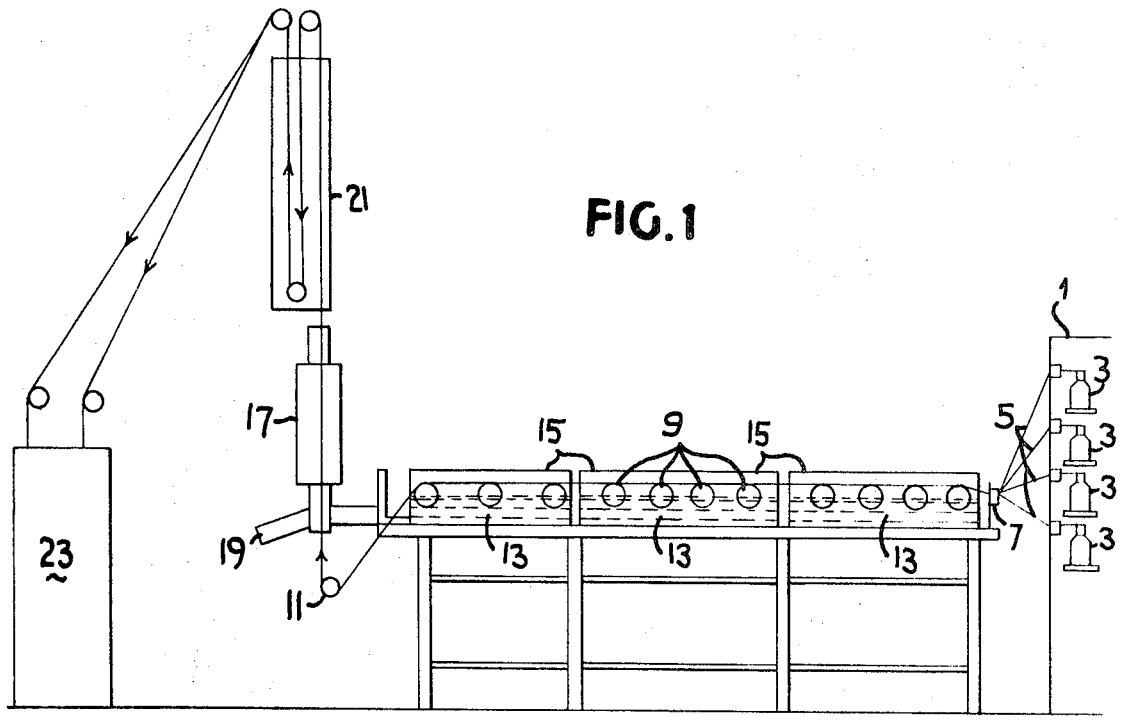

This is a continuation of copending application 662,384, filed Aug. 22, 1967, and now abandoned.

BACKGROUND OF THE INVENTION

This invention relates to treated glass fibers and, more particularly, to an improved process for manufacturing elastomer coated glass fiber strand, yarn, cord or fabric.

The desirability of the use of glass fibers to reinforce natural and synthetic elastomeric materials, such as nitrile rubber, SBR and neoprene rubber is generally well-known. The principal advantages provided by the use of glass fibers as a reinforcement for rubber include: excellent tensile strength, which is unaffected by moisture and temperature up to about 600° F.; excellent dimensional stability; definite elongation characteristics; outstanding resistance to cold flow or yield under stress; and good aging characteristics. However, even though the above represent significant property advantages over existing rubber reinforcements, such as cotton, rayon, nylon and polyester, difficulty was encountered in converting the glass fibers into a suitable reinforcement system for natural and synthetic elastomeric materials.

An advance in promoting the acceptance of glass fibers as a reinforcement system for rubber and the like was made when it was proposed that glass fiber strand first be coated with a coupling agent and, either simultaneously therewith or during a subsequent treatment, coated with an elastomeric material that is compatible with the elastomer which the glass fiber strand is intended to reinforce. However, while this treatment demonstrated that better utilization could be made of the properties of glass fibers as a reinforcement material, additional problems arose in connection with the processing techniques that were employed to produce elastomer coated glass fibers and, more particularly, elastomer coated glass fiber strands.

Among these additional problems were the difficulties that were encountered in drying coated glass fibers that were wet or saturated with elastomeric dip while processing the glass fibers through a heated atmosphere over supporting and conveying elements. Thus, in one previously practiced process, the elastomer coating was initially provided by coating and impregnating the glass fibers with an aqueous solution or liquid dip containing the elastomer. The wet or saturated glass fibers were then supported and conveyed under slight tension over rollers or the like as they traversed through a heated atmosphere to dry the elastomer coating on the glass fibers.

Among the problems that arose in connection with the aforesaid processing technique were those of drying the elastomer coated glass fibers without stripping off coating material and/or depositing coating material on the conveying and supporting elements; of producing elastomer coated glass fibrous material that was not tacky and was therefore susceptible of being readily handled and processed by winding, twisting, plying or weaving operations into strand, yarn, cord, cable, fabric or the like; and of continuously producing elastomer coated glass fibrous products at a high rate of speed without the necessity of additional expenditures in processing steps, time and equipment to produce a desirable product.

As disclosed in copending application, Ser. No. 605,814, filed Dec. 29, 1966, entitled Manufacture of Elastomer Coated Glass Fibers, and assigned to applicant's assignee, the foregoing problems can be avoided or substantially alleviated by employing high frequency electrical heating, such as dielectric heating, to dry coated glass fibers that are wet or saturated with an aqueous elastomeric adhesive composition. As is set forth more fully in that application, the use of dielectric drying permits processing coated glass fibers over rolls, pulleys and the like without stripping off coating material and/or depositing coating material on supporting and conveying elements. Also, dielectric drying produces elastomer coated fibrous material that is not tacky and is therefore susceptible of being readily handled and processed by winding, twisting, plying or weaving operations into strand, yarn, cord, cable, fabric or the like. Moreover, compared to conventional drying by hot air or radiant heat, dielectric drying provides improved uniformity of the coating on the glass fibers. This is evidenced by a uniformity of amount and coloring of the coating, the absence of bubbles or pits on the coated glass fibers and the absence of "flags" or lumps of adhesive along the length of the coated glass fibers.

In addition, where it is desired or required to pass the coated glass fibers through a curing oven subsequent to drying, the dielectric drying permits faster production speeds for a given length of curing oven, the use of shorter curing ovens, and better process control than was the case with conventional drying and curing processes that do not utilize dielectric drying. Furthermore, elastomer coated strand can be processed five to six times faster through the curing oven when exposed first to dielectric drying than was possible when dielectric drying was not used.

While the foregoing disclosure of the copending application represents a significant advancement in processing elastomer coated glass fibers, a further problem arose in connection with the process and apparatus employed for dielectric drying. This problem was the deposition and/or eventual build-up of elastomeric dip material on the electrodes of the dielectric heater after a period of continuous or prolonged use in the process of drying elastomer coated glass fibers. During the porcess of drying by dielectric heating and particularly when operating at high speeds, a relatively violent boiling or volatilizing off of aqueous constituents of the dip occurs, such that very fine particles of the elastomer solids are driven off of the coated glass fibers and are "spattered" or deposited on the adjacent electrodes of the dielectric heater.

Under conditions of continuous or prolonged operation, the electrodes eventually become so heavily coated that they induce an "arc-out" of the dielectric process which necessitates down time for cleaning. "Arc-out" occurs as a result of dielectric breakdown or an insufficient electrical gap being present between the coated glass fibers that are wet or saturated with elastomeric dip and the electrodes of the dielectric heater. Short of "arc-out" occurring, it is, of course, necessary to maintain a regularly scheduled shutdown of the entire process for the purpose of cleaning the electrodes of the dielectric heater. Under either condition, there is a drastic reduction of over-all operating efficiency.

SUMMARY OF THE INVENTION

Briefly, the present invention provides a novel method for improving the over-all operating efficiency of a process employing high frequency electric heaters for the purpose of fixing, setting or drying an aqueous coating composition on fibrous material. More specifically, the present invention teaches the advantageous use of soft water as the aqueous component of the coating composition. The term "soft water" means water having a hardness measured as parts by weight of calcium carbonate per one million parts by weight of water being tested which is substantially less than the hardness of a standard hardness solution as defined in ASTM D-1126-55T for industrial water. The softer the water the better for purposes of the present invention. As the hardness of the water is greater, the effectiveness of the invention is decreased. Preferably, the water should have a hardness of less than 50 parts per million as $CaCO_3$ determined by ASTM test D-1126-55T, but improved results can be obtained with water having a hardness of less than 100 parts per million as $CaCO_3$. Distilled water or demineralized water having a hardness of about zero, i.e., less than about 10 parts per million as $CaCO_3$ represents the best mode of performing the present invention.

Figure 2:
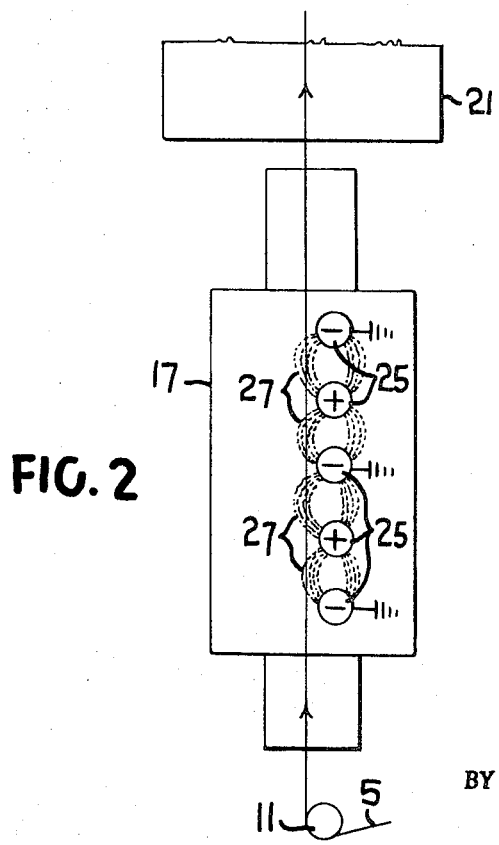

The advantages of this invention will become more apparent when considered in connection with the accompanying drawings, wherein:

FIG. 1 is a diagrammatic representation of a typical flow process that may be employed in the practice of the invention; and FIG. 2 is a diagrammatic representation of high frequency dielectric heating apparatus that may be employed in the practice of the invention.

Referring to the drawings in detail, FIG. 1 shows a creel 1 having mounted thereon a plurality of bobbins 3 containing glass fiber strand 5. Each of the glass fiber strands 5 is coated with a sizing material comprising a lubricant, binder and coupling agent, such as disclosed in U.S. patent application Ser. No. 535,683, filed Mar. 21, 1966, and assigned to the assignee of the present invention. Other suitable size materials that contain suitable coupling agents may be found in U.S. patent applications Ser. No. 599,180, filed Dec. 5, 1966, for Novel Reaction Product and Use Thereof as a Glass Fiber Size, by Charles W. Killmeyer and George E. Eilerman, and Ser. No. 601,341, filed Dec. 13, 1966, for Glass Fibers for Elastomer Reinforcement, by Joe B. Lovelace and David H. Griffiths, both applications being assigned to applicants' assignee. Furthermore, as is conventional, each of the glass fiber strands 5 has imparted therein a 0.5 turn per inch twist to provide strand integrity and resistance to fuzzing during initial handling or processing prior to being coated and impregnated with elastomeric material.

The strands 5 are combined in parallel relation and passed through a ceramic guide 7, in tangential contact across motor driven rotating rollers or coating applicators 9, to a motor driven rotating wiper roller or pulley 11. The applicators 9 are partially suspended in an aqueous elastomeric coating composition 13 contained within vessels or tanks 15. The applicators 9 are driven counter to the direction of travel of the strand 5 to improve the coating and impregnation thereof. The pickup of coating composition 13 by the applicators 9 and strand 5 is more than sufficient to coat and impregnate the strands with the desired final amount of coating composition 13. The wiper roller or pulley 11 is driven counter to the direction of travel of the strand 5 and serves to further impregnate the strand while removing excess coating composition 13.

From the wiper roller or pulley 11, the coated, impregnated strands are passed vertically through a dielectric heater or drying oven 17, wherein certain volatile constituents of the coating composition 13 are driven off and removed from the dielectric oven 17 by means of a blower 19. A suction device (not shown) could be used in lieu of or in addition to the blower 19 and would preferably be located adjacent the upper or exit end of vertically arranged dielectric oven 17. The construction of a typical dielectric heating or drying oven, suitable for use with the present invention, is shown more fully in FIG. 2.

Referring to FIG. 2, there is shown a diagrammatic representation of dielectric heater 17 comprising a vertically arranged series of spaced electrodes 25 electrically connected to a suitable power source (not shown) to produce an alternating, high frequency electrical field 27 between successive oppositely charged electrodes. Since the detailed construction and principle of operation of dielectric heaters does not, per se, form a part of the present invention, reference is made to U.S. Pats. Nos. 2,503,779 and 2,865,790 for these details. For a complete understanding of the present invention, it will be sufficient to point out that as strands 5, coated and impregnated with aqueous elastomeric coating composition 13, traverse across but not contacting the electrodes 25 and through fields 27, the liquid component of the dip, which has a higher dielectric constant than the solid component, is electrically activated to produce a uniform heating action throughout composition 13. For the purpose of the present invention, the rate and amount of electrical activation or dielectric heating is controlled to the extent of removing or volatilizing substantially all of the liquid component of the aqueous composition while leaving the solid component substantially unaffected. The coated and impregnated strands 5, as they leave dielectric heater 17, are free of bubbles and sufficiently dry and free of tack for the purpose of further processing the strand over rolls, pulleys or the like without fear of stripping off coating material and/or depositing coating material on supporting and conveying elements or the like.

Thereafter, the coated strands pass upwardly and then traverse through a hot gas oven 21 or other suitable heating device to cure or react the solid component of the adhesive 13, as will be explained more fully hereinafter. Following attainment of the desired degree of cure, the adhesive coated fiber glass strands are removed from the curing oven 21 and either collected on a suitable take-up device 23 or passed on for further processing.

After curing, the coated glass fiber strands are susceptible of being readily handled and, more particularly, of being processed by winding, twisting, plying or weaving operations into strand, yarn, cord, cable, fabric or the like without sticking or blocking of the coated glass fibrous material and without the necessity of applying thereto an additional "slip" coating.

As mentioned above, controlled electrical activation or dielectric heating of the coated strands 5 results in removing or volatilizing off undesired constituents of the elastomeric coating composition. This drying or volatilizing off of coating composition proceeds in a relatively rapid and violent manner such that particles of the composition solids are driven off of the coated glass fibers. These solids are "spattered" or deposited on the adjacent electrodes 25 of the dielectric heater 17. Excessive build-up or deposit of elastomer solids on the electrodes eventually results in inducing "arc-out" or "short-circuiting" of the dielectric process, necessitating down time for cleaning.

According to the present invention, a specially prepared composition greatly lessens this tendency of the composition to coat the electrodes. A typical example of such a composition is described below.

EXAMPLE

A rubber adhesive was prepared from the following ingredients:

| Ingredients: | Parts by weight |
|---|---|
| Resorcinol | 352 |
| $CH_2O$ (37%) aqueous solution | 518 |
| NaOH | 9.6 |
| Butadiene-styrene vinyl pyridine terpolymer latex (Gen-Tac 41% solids dispersed in $H_2O$) | 7800 |
| $NH_4OH$ (28% $NH_3$ in $H_2O$) | 362 |
| $H_2O$ (soft) | 9572 |

The water employed in the preparation of the coating composition had the following analysis by Hall Laboratories, a Division of Calgon Corporation of Pittsburgh, Pa.

| Test: | Value |
|---|---|
| pH value at 25° C. | 7.9 |
| Tiltration (milliliters): | |
| A reading | 0 |
| MO reading | 16.7 |
| Concentrations (parts per million): | |
| Bicarbonate ($HCO_3$) | 340 |
| Sulfate ($SO_4$) | 45 |
| Chloride (Cl) | 17 |
| Silica ($SiO_2$) | 15 |
| Hardness (as $CaCO_3$) | 0.6 |
| Sodium (Na) | 175 |
| Conductivity at 77° F. (micromhos per centimeter) | 670 |

These ingredients were mixed in the following manner. The Gen-Tac terpolymer latex was mixed with 1940 parts by weight of water. Water (7632 parts by weight) was added to a separate container. NaOH was then added and dissolved in the water in the separate container. Resorcinol was next added to the aqueous solution of NaOH and dissolved therein. Formaldehyde was added after the resorcinol and the mixture was stirred for 5 minutes and allowed to age at room temperature for two to six hours. The aging permits a small amount of condensation of resorcinol and formaldehyde and provides superior "H" test adhesion of the subsequently coated yarn to the rubber stock. The "H-Adhesion" test is a standard rubber industry test designated as ASTM–D–2138–62T issued in 1964. After aging, this mixture was added to the Gen-Tac latex and the resultant mixture was stirred slowly for 15 minutes. Ammonium hydroxide was then added and the mixture was stirred slowly for 10 minutes. The ammonium hydroxide inhibits further condensation of the resorcinol formaldehyde.

Sized glass fiber strands produced as described in U.S. patent application Ser. No. 535,683, supra, were coated and impregnated with the above adhesive, as described more fully hereinbelow.

Five strands (ECG–75's) with one-half turn per inch of twist were combined in parallel relation and passed under slight tension over rotating rollers 9 which were partially suspended in the adhesive 13. The pickup of adhesive dip was approximately 50–125% by weight of dip based on the weight of strands and was sufficient to provide a final coating on the strands of about 10 to 25 percent by weight of adhesive solids based upon the weight of strands. Above seven percent (7%) by weight of adhesive solids based on the weight of strands, and preferably above twelve percent (12%) by weight of adhesive solids based on the weight of strands, is normally required to produce the desired tensile strength for strand used in reinforcing mechanical rubber goods. Fifteen percent (15%) by weight of adhesive solids based on the weight of strands has been found to be suitable for most purposes.

A pickup of adhesive dip sufficient to provide a final coating on the strands of above seven percent (7%) by weight of adhesive solids based on the weight of strands produces a tacky product when dried by conventional hot gas or radiant heating means. A dried, tacky strand cannot thereafter be readily processed over rolls or the like without stripping off coating material and/or depositing coating material on the rolls or other handling equipment.

The coated strands 5 were passed vertically through a 36-inch high dielectric drying oven 17 to remove the water and $NH_3$ from the adhesive. Dielectric heater or drying oven 17 was operated at 4000–5000 volts between electrodes and a frequency of 27–30 megacycles. Unlike drying with conventional hot gas or radiant heating means, the strands, on leaving the dielectric heater, were free of bubbles and sufficiently dry and free of tack for further processing over rolls or the like without stripping off coating material and/or depositing coating material on the rolls. The drying process was run at a speed of 150 feet per minute for 24 hours with little noticeable accumulation of coating composition on the electrodes. When the same coating composition was prepared with water having a hardness of about 155 parts per million calcium carbonate and the coated strand run at the same speed, the electrodes became so badly coated with coating composition in 5 hours that the electrodes began to arc out and improper drying resulted.

The coated strands were next passed upwardly through a hot gas oven 21 maintained at a temperature of about 300° to 500° F. to effect curing of the resorcinol formaldehyde. The curing or condensing of the resorcinol formaldehyde is free to proceed with the removal of the $NH_3$. The condensation is time-temperature dependent. For example, heating the coated strands for 30 seconds at 370° F. or 20 seconds at 420° F. with the strands making several passes through oven 21 at a rate of speed of about 150–300 feet per minute is satisfactory. In any event, it has been found that for a given time-temperature relationship to effect curing of the resorcinol formaldehyde and for a given length of oven in which to accomplish the desired cure, the coated strands can be processed five to six times faster through the curing oven when exposed first to dielectric heating than was possible when dielectric heating and drying was not used. As aforesaid, the strands 5, or leaving the hot gas oven 21, were susceptible of being readily handled and processed by winding, twisting, plying or weaving operations without sticking or blocking of the coated glass fibrous material and without the necessity of applying an additional "slip" coating thereto.

The following rubber compound was reinforced with glass fibers that were sized, coated and processed as described above and the reinforcement was tested for "H" adhesion in accordance with the aforementioned ASTM test D–2138–62T. The glass reinforcement used was cord of ECG–75–5/3 construction. The chemical identification of the ingredients in the rubber compound can be found in "Materials and Compounding Ingredients of Rubber and Plastics," published by Rubber World.

| Ingredients: | SBR-natural rubber blend |
|---|---|
| SBR 1500 | 75 |
| No. 1 RSS (ribbed smoked sheet) | 25 |
| HAF black | 50 |
| ZnO | 5 |
| Stearic acid | 1 |
| Age-rite resin (anti-oxidant) | 1 |
| Sundex 790 (plasticizer) | 10 |
| Santocure (accelerator) | 1 |
| DOTG | 0.2 |
| Sulfur | 2.0 |

"H-Adhesion" test at 230° F. for 30 minutes (average 28 to 32 pounds)

The advantages that accrue from the practice of the present invention are fully borne out by the aforementioned disclosures in U.S. Pats. 3,029,589, 3,029,590 and 3,287,204, as well as published South African patent application No. 65/5,536, filed Oct. 14, 1965.

In U.S. Pats. 3,029,589 and 3,029,590, for example, there is disclosed an elastomer coating process wherein latex coated glass fiber strand is dried and cured in a conventional hot air oven maintained at a temperature such that the coating material does not boil or is not otherwise erratically disturbed during curing. As disclosed therein, the temperature for latex rubber material which will not generally effect a boiling of moisture therein and which thus will not cause bubbles in the coating due to such boiling, is in the order of 250° F. However, both of these patents also disclose that processing coated strand at a speed in the order of 100 feet per minute through a conventional oven having a length of 12 feet and maintained at a temperature in the order of 250° F. resulted in producing cured strand that was tacky. Thus, in an attempt to solve the bubble problem, a further problem of tackiness was encountered. No dielectric or high frequency electrical heating was disclosed as being employed in connection with either of the foregoing patents.

Furthermore, in one representative example disclosed in the aforesaid South African patent application, sized fiber glass strand was coated and impregnated with the following latex dip composition:

40–80 percent by weight of a natural rubber latex-resorcinol formaldehyde resin dispersed in aqueous medium to a solids of 38 percent by weight. (Lotol 5440— U.S. Rubber Company, Naugatuck Chemical Division.)

The strand impregnated with the above composition was advanced through a conventional drying oven maintained at a temperature within the range of 250° to 400° F. to remove the diluent from the impregnating composition and to advance the cure of the materials in the coating to either an almost fully cured or a fully cured state. No dielectric or high frequency electrical heating was employed, and the elastomeric coating on the sized glass fiber surfaces was disclosed as being subject to tackiness or seizures when subsequently processed in winding, twisting, plying or weaving operations for use as a reinforcement in rubber tires, rubber belts, rubber coated fabrics or other glass fiber reinforced elastomeric products.

In addition, in U.S. Pat. No. 3,287,204, there is disclosed a similar process to that employed in the above patent and wherein the drying oven is maintained at an elevated temperature, such as at about 400° F., sufficient to remove the diluent from the applied elastomeric coating composition and to advance the cure or vulcanization of the elastomeric material in the coating to a stage less than the fully cured or vulcanized stage. No dielectric or high frequency electrical heating is disclosed as being used.

In each of the above prior art publications, reference is made, either directly or indirectly, to the production of elastomer coated fiber glass strands that have an undesirable tendency towards tackiness, which results in sticking or blocking of the strand during winding, twisting, plying or weaving operations. Furthermore, each of the above prior art disclosures finds it necessary to resort to the expedient of applying various powdered coatings, such as zinc stearate, corn starch, talc, polyethylene, silica, carbon black and the like, to alleviate the tackiness condition prior to subsequent handling and processing. In addition, in each case these various "slip" coatings are preferably removed by a washing operation or the like at some point prior to final use of the elastomer coated strand. The undesirability of these additional procedural steps should be apparent.

On the contrary, an elastomeric dip mixture of 50 percent by weight Lotol 5440 and 50 percent by weight water, such as disclosed in the aforesaid South African patent application, when processed as described above by using soft water and dielectric drying yielded in an economical long term uninterrupted high speed run an elastomer coated fiber glass strand that was free of bubbles and susceptible of being readily handled and processed by winding, twisting, plying or weaving operations into strand, yarn, cord, cable, fabric or the like without sticking or blocking of the coated glass fibrous material, thus avoiding the necessity of applying an additional "slip" coating thereto. Furthermore, in addition to being completely free of undesirable bubbles at the end of the dielectric heating operation, the coated and impregnated strand was sufficiently dry and free of tack for the purpose of being further processed over rolls, pulleys or the like in the curing oven without stripping off coating material and/or depositing coating material on supporting and conveying elements.

The use of soft water in the coating composition permits processing the strands through the dielectric oven without deposition of coating composition on the electrodes in the oven. This may be tied in with the non-tacky nature of the coating. It can be theorized that a tacky material holds the water more tightly and more energy is required to release the water from the coating on the strand. Thus the water is fairly exploded from the coating and carries particles of coating with it which then deposit on the electrodes.

In addition, the invention permits faster production speeds for a given length of curing oven, the use of shorter curing ovens, and better process control than is the case with conventional drying and curing processes that do not utilize soft water and the dielectric heating step. Furthermore, as mentioned above, elastomer coated strand can be produced five to six times faster through the curing oven.

The term "elastomer" as used herein and in the claims is intended to include elastic substances such as natural latex from the Hevea tree and synthetic rubber and rubber-like materials which have been chemically modified such as by chlorination to improve their physical properties. Synthetic rubber includes rubber-like materials such as chloroprene, butadiene, isoprene and copolymers thereof with acrylonitrile, styrene and isobutylene. The term "elastomer" includes natural and synthetic rubber in the uncured or unvulcanized state as well as in the cured or vulcanized state.

While the term "glass fibers" is preferably employed to define continuous glass fibers as well as strands, yarns, cords and fabrics formed thereof, it is also within the contemplation of this invention to include within this term discontinuous, chopped or otherwise processed glass fibers, as well as strands, yarns, cords and fabrics formed thereof.

The term "high frequency electrical heating" as used herein is not intended to be limited solely to the disclosed use of what is commonly referred to as dielectric heating but rather is also intended to include all forms of high frequency electrical heating, including microwave heating, operating within the range of about 5 to about 3000 megacycles.

Although the present invention has been described with respect to specific details of certain embodiments thereof, it is not intended that such details act as limitations upon the scope of the invention except insofar as set forth in the accompanying claims.

I claim:

1. In the method of coating and impregnating glass fibers comprising applying an aqueous adhesive composition to glass fibers, said adhesive composition containing heat curable resin, elastomer latex solids and volatile liquid components, passing the adhesive-coated glass fibers through an electrical field induced by high frequency electrical heating means, said electrical field extending predominately parallel to the path of travel of said adhesive-coated glass fibers and being sufficient to electrically activate the liquid components of said adhesive composition at a rate sufficient to volatilize and remove substantially all of said liquid components from said adhesive composition without substantially curing said heat curable resin until a glass fiber product is obtained with an elastomeric material on the surface thereof which is substantially uniformly free of said volatilizable liquid components and sufficiently dry and free of tack to permit the immediate processing of the coated glass fibers on handling equipment, and curing the heat curable resin by the subsequent application of additional heat, the improvement which comprises utilizing soft water having a hardness of less than 100 parts per million as calcium carbonate for the aqueous component of the adhesive composition.

2. The method of claim 1 wherein drying is accomplished by dielectric heating within the range of about 5 to about 3,000 megacycles.

3. The method of claim 1 wherein the coating contains a resin inhibitor which is driven off with the water upon drying.

4. The method of claim 1 wherein the fiber glass is sized with a material containing a coupling agent prior to coating.

5. The method of claim 1 wherein the elastomer latex is butadiene-styrene-vinyl pyridine terpolymer.

6. The method of claim 1 wherein the heat curable resin is resorcinol formaldehyde.

References Cited

UNITED STATES PATENTS

| | | | |
|---|---|---|---|
| 2,865,790 | 12/1958 | Baer | 117—93.1 |
| 3,350,345 | 10/1967 | Vanderbilt et al. | 117—126X |
| 3,367,793 | 2/1968 | Atwell | 117—126X |
| 3,437,122 | 4/1969 | Van Gils | 260—846X |

WILLIAM D. MARTIN, Primary Examiner

D. COHEN, Assistant Examiner

U.S. Cl. X.R.

117—93.1, 126

PO-1050
(5/69)

UNITED STATES PATENT OFFICE
CERTIFICATE OF CORRECTION

Patent No. 3,583,882          Dated     June 8, 1971

Inventor(s)  Norman G. Bartrug

It is certified that error appears in the above-identified patent and that said Letters Patent are hereby corrected as shown below:

On the Letters Patent the assignor is indicated as "Pittsburgh Plate Glass Company" instead of ---PPG Industries, Inc.---.

Signed and sealed this 7th day of December 1971.

(SEAL)
Attest:

EDWARD M. FLETCHER, JR.           ROBERT GOTTSCHALK
Attesting Officer                 Acting Commissioner of Patents